July 9, 1957     J. W. LARKIN     2,798,736
REAR WHEEL STABILIZER FOR MOTOR VEHICLES
Filed June 1, 1956
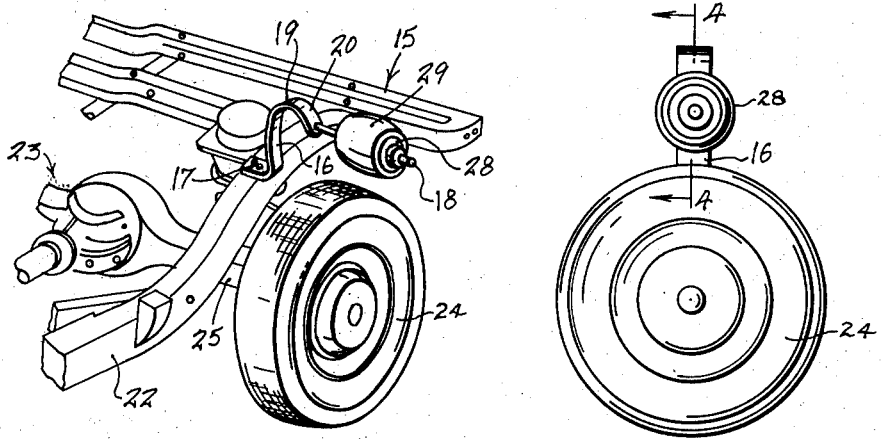
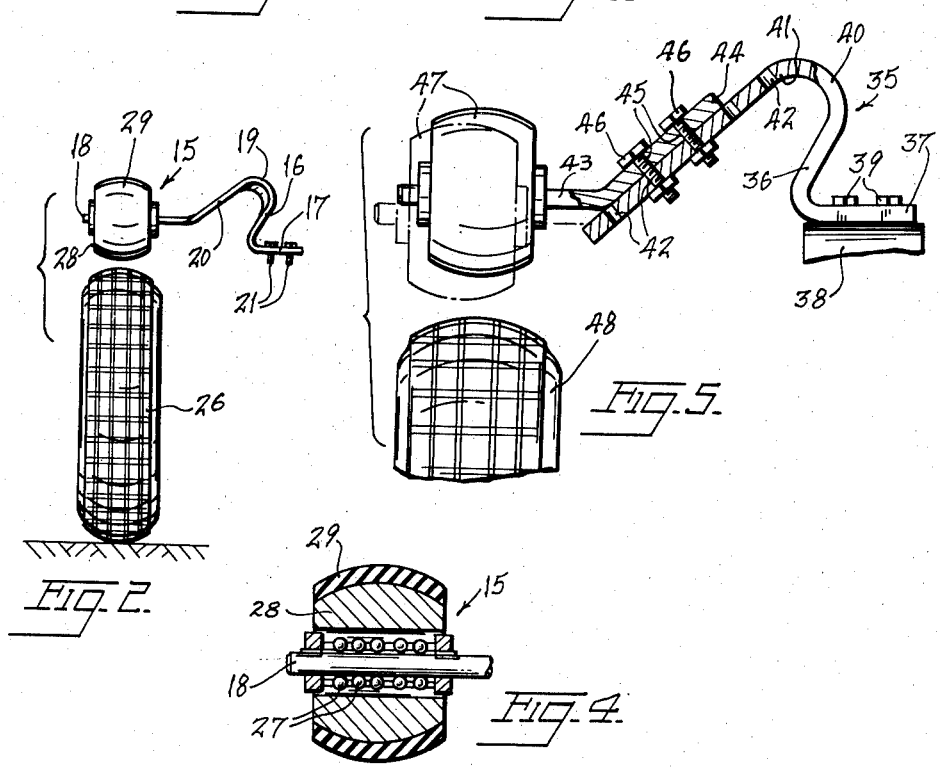
INVENTOR.
JOHN WILLIAM LARKIN
BY
ATTORNEY

United States Patent Office 2,798,736
Patented July 9, 1957

2,798,736

REAR WHEEL STABILIZER FOR MOTOR VEHICLES

John William Larkin, New York, N. Y.

Application June 1, 1956, Serial No. 588,774

4 Claims. (Cl. 280—124)

This invention relates to new and useful improvements in stabilizer devices for automobiles and other motor vehicles.

More particularly, the present invention proposes the construction of a spring rear wheel stablizer device which will dampen the rock or roll of the body of a motor vehicle on its chassis and will stabilize the vehicle for a safer and smoother ride.

Still further, the present invention proposes forming the stabilizer with means to relieve part of the strain on the rear axles of a vehicle when the vehicle body starts to pitch, rock or roll.

Another object of the invention proposes constructing the stabilizer so that it can easily be mounted on any type of motor vehicle merely by fastening, by bolting, welding or any other common fastening means, an attachment plate to the chassis or frame of a vehicle.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a fragmentary perspective view of the chassis or frame of an automobile and of a stabilizer constructed and arranged in accordance with the present invention.

Fig. 2 is a rear view of the tire and stabilizer shown in Fig. 1.

Fig. 3 is a side view of the structure shown in Fig. 2.

Fig. 4 is a sectional view taken on line 4—4 of Fig. 3.

Fig. 5 is a view similar to Fig. 2 but illustrating a modification of the present invention.

Referring more particularly to the drawings, the stabilizer in accordance with the first form of the invention shown in Figs. 1 to 4, inclusive, is designated generally by the reference numeral 15.

Rear wheel stabilizer device 15 has a heavy spring 16 with an anchoring plate 17 at one end and a spindle or axle 18 at the other end. Spring 16 also has a crook 19 intermediate its ends with a spindle connecting inclined leg 20 which is inclined upwardly and rearwardly from the spindle 18.

Plate 17 is secured as by bolts 21 through appropriate openings or by welding to the chassis or frame 22 of an automobile or other motor vehicle 23 adjacent a rear wheel 24. Preferably a pair of stabilizers 15 is provided for each vehicle, one for each rear wheel.

The spindle 18 is in longitudinal axial alignment with spring 16 and extends over the wheel 24 parallel with the rear axle 25 and across the wheel 24 perpendicular to the normal vertical plane of the tire 26.

Rotatably mounted on the spindle 18 by ball bearings 27 is a stabilizer roller 28 having a resilient face 29 of rubber, plastic or the like, or made entirely of such material. The face 29 of roller 28 is convex and is normally held spaced from the top of the tire 26 by the spring 16 so that there is an air gap between the roller and the tire. The ball bearings 27 may be lubricated with antifreeze oil and graphite for winter use.

When the body of the car is rocking or rolling, the roller 28 contacts the upper part of the tire 26 producing a stabilizing action. At the moment of contact part of the axle and body strain is relieved and transmitted directly to the tire. When making sharp turns, the stabilizer reduces body rock and tends to reduce skidding on slippery roads.

The modification of the invention illustrated in Fig. 5 is characterized by the provision of a stabilizer 35 having a heavy spring 36 with an attaching plate 37 mounted on a vehicle chassis 38 as by bolts 39. Spring 36 has a crook 40 with a spindle connecting inclined leg 41 having a plurality of spaced adjustment bolt openings 42.

A spindle or axle 43 has an attaching end 44 with spaced bolt openings 45 adapted to match with pairs of the bolt openings 42 in leg 41 of spring 36 and bolts 46 secure the spindle adjustably to the spring through bolt openings 45 and 42. Rubber or resilient roller 47 is rotatably mounted on the spindle over a rear tire 48 of a vehicle. The inclination of the leg 41 of spring 36 and of the attachment end 44 of spindle 43 permits the roller 47 to be adjusted relative to tire 48 both to raise and lower the roller with respect to the tire and to move the roller laterally with respect to the tire.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A spring rear wheel stabilizer device for motor vehicles comprising a heavy spring having two ends, anchoring means at one end of the spring for mounting the spring on a motor vehicle chassis at one side of a rear wheel tire, a spindle at the other end of the spring in longitudinal axial alignment with the spring, and a stabilizer roller rotatably mounted on the spindle, said spring having a crook intermediate the ends with a spindle connecting leg inclined upwardly and rearwardly from the spindle, said anchoring means for mounting the spring being adjustable to raise and lower the roller with respect to a tire and move the roller laterally with respect to the tire, said anchoring means being a mounting bracket on the spindle with spaced fastener openings, said spring having a plurality of spaced fastener openings in the spindle connecting leg and fastener members removably to fit the fastener openings.

2. A spring rear wheel stabilizer device for motor vehicles comprising a heavy spring having two ends, anchoring means at one end of the spring for mounting the spring on a motor vehicle chassis at one side of a rear wheel tire, a spindle extending from the other end of the spring in longitudinal axis alignment with the spring and forming an extension thereof, and a stabilizer roller rotatably mounted on the spindle, said spring having a crook intermediate the ends with a spindle connecting leg inclined upwardly and rearwardly from the spindle, said crook being disposed to hold the spindle extension perpendicular to the normal vertical plane of a tire when the spring is secured to a chassis by said anchoring means.

3. A spring rear wheel stabilizer device for motor vehicles comprising a heavy spring having two ends, anchoring means at one end of the spring for mounting the spring on a motor vehicle chassis at one side of a rear wheel tire, a spindle at the other end of the spring in longitudinal axial alignment with the spring, and a stabilizer roller rotatably mounted on the spindle, said spring having a crook intermediate the ends with a spindle connecting leg inclined upwardly and rearwardly from the spindle, said anchoring means for mounting the spring being adjustable to raise and lower the roller with respect to a tire and move the roller laterally with respect to the tire, said anchoring means being a mounting bracket on the spindle with spaced fastener openings, said spring having a plurality of spaced fastener openings in the spindle connecting leg and fastener members removably to fit the fastener openings, said roller having a convex curved resilient face.

4. A spring rear wheel stabilizer device for motor vehicles comprising a heavy spring having two ends, anchoring means at one end of the spring for mounting the spring on a motor vehicle chassis at one side of a rear wheel tire, a spindle at the other end of the spring in longitudinal axial alignment with the spring, and a stabilizer roller rotatably mounted on the spindle, said spring having a crook intermediate the ends with a spindle connecting leg inclined upwardly and rearwardly from the spindle, said anchoring means for mounting the spring being adjustable to raise and lower the roller with respect to a tire and move the roller laterally with respect to the tire, said anchoring means being a mounting bracket on the spindle with spaced fastener openings, said spring having a plurality of spaced fastener openings in the spindle connecting leg and fastener members removably to fit the fastener openings, said roller having a convex curved resilient face, said crook being disposed to hold the spindle longitudinal axis extending perpendicular to the normal vertical plane of a tire when the spring is secured to a chassis by said anchoring means.

References Cited in the file of this patent

UNITED STATES PATENTS

| | | |
|---|---|---|
| 1,897,538 | Taber | Feb. 14, 1933 |
| 2,356,979 | Delp et al. | Aug. 29, 1944 |
| 2,580,975 | Tea | Jan. 1, 1952 |

FOREIGN PATENTS

| | | |
|---|---|---|
| 647,186 | Germany | June 30, 1937 |